US009336443B2

(12) United States Patent
Nagaoka et al.

(10) Patent No.: US 9,336,443 B2
(45) Date of Patent: May 10, 2016

(54) METHOD AND APPARATUS FOR ORGANIZING DIGITAL MEDIA BASED ON FACE RECOGNITION

(71) Applicants: FUJIFILM CORPORATION, Tokyo (JP); FUJI XEROX CO., LTD., Tokyo (JP)

(72) Inventors: Yasuhiko Nagaoka, Cupertino, CA (US); Sugiharto Sudiro Widjaja, San Mateo, CA (US); Yuwen Wu, Sunnyvale, CA (US); Jeffery Jon Sunzeri, San Jose, CA (US); John E. Adcock, Menlo Park, CA (US); Andreas Girgensohn, Menlo Park, CA (US); Lynn D. Wilcox, Palo Alto, CA (US)

(73) Assignees: FUJIFILM Corporation, Tokyo (JP); FUJI XEROX CO., LTD, Tokyo (JP)

( * ) Notice: Subject to any disclaimer, the term of this patent is extended or adjusted under 35 U.S.C. 154(b) by 0 days.

(21) Appl. No.: 14/296,810

(22) Filed: Jun. 5, 2014

(65) Prior Publication Data

US 2014/0286543 A1 Sep. 25, 2014

Related U.S. Application Data

(60) Continuation of application No. 12/858,097, filed on Aug. 17, 2010, now Pat. No. 8,781,178, which is a division of application No. 10/734,259, filed on Dec. 15, 2003, now Pat. No. 7,822,233.

(60) Provisional application No. 60/519,639, filed on Nov. 14, 2003.

(51) Int. Cl.
*G06K 9/00* (2006.01)
*G06F 17/30* (2006.01)

(52) U.S. Cl.
CPC ...... *G06K 9/00677* (2013.01); *G06F 17/30247* (2013.01)

(58) Field of Classification Search
USPC .................................................. 382/118, 224
See application file for complete search history.

(56) References Cited

U.S. PATENT DOCUMENTS

| 6,430,306 B2 | 8/2002 | Slocum et al. |
| 6,453,078 B2 | 9/2002 | Bubie et al. |
| 6,714,665 B1 | 3/2004 | Hanna et al. |
| 6,738,494 B1 | 5/2004 | Savakis et al. |

(Continued)

FOREIGN PATENT DOCUMENTS

| JP | 2001-155025 A | 6/2001 |
| JP | 2002-189724 A | 7/2002 |

(Continued)

*Primary Examiner* — John Strege
(74) *Attorney, Agent, or Firm* — Birch, Stewart, Kolasch & Birch, LLP

(57) ABSTRACT

In one aspect, the present invention is directed to a method and an apparatus for organizing digital media, particularly digital photos, using face recognition. According to a first aspect of the present invention, a computer-based method for organizing digital photos comprises: extracting objects of interest from a plurality of photographs; cropping said plurality of photographs to generate images of isolated objects of interest; applying a recognition algorithm to determine the similarity of isolated objects of interest with a reference; displaying a plurality of objects arranged as a function of the determined similarity; and receiving user input to associate said objects with a particular classification.

20 Claims, 7 Drawing Sheets

(56) References Cited

U.S. PATENT DOCUMENTS

| | | |
|---|---|---|
| 6,751,353 B1 | 6/2004 | Grigorievich et al. |
| 6,751,780 B1 | 6/2004 | Neff et al. |
| 7,203,367 B2 | 4/2007 | Shniberg et al. |
| 7,822,233 B2 * | 10/2010 | Nagaoka et al. ............. 382/118 |
| 2002/0167538 A1 | 11/2002 | Bhetanabhotla |
| 2003/0059107 A1 | 3/2003 | Sun et al. |
| 2004/0141658 A1 | 7/2004 | Haas et al. |
| 2004/0264780 A1 | 12/2004 | Zhang et al. |
| 2005/0060636 A1 | 3/2005 | Mathe |

FOREIGN PATENT DOCUMENTS

| | | |
|---|---|---|
| JP | 2002-215643 A | 8/2002 |
| JP | 2003-150603 A | 5/2003 |
| JP | 2003-204541 A | 7/2003 |
| JP | 2003-281157 A | 10/2003 |
| JP | 2003-298991 A | 10/2003 |
| JP | 2004-46677 A | 2/2004 |

* cited by examiner

METHOD AND APPARATUS FOR ORGANIZING DIGITAL MEDIA BASED ON FACE RECOGNITION

CROSS-REFERENCE TO RELATED APPLICATION

This application is a Continuation of Ser. No. 12/858,097 filed on Aug. 17, 2010, which is a Divisional of and claims the benefit under 35 USC §120 of co-pending Nonprovisional application Ser. No. 10/734,259 filed on Dec. 15, 2003, which claims the benefit under 35 U.S.C. §119 of U.S. Provisional Application No. 60/519,639 filed on Nov. 14, 2003. The entire contents of all of the above applications is hereby incorporated by reference.

BACKGROUND OF THE INVENTION

1. Field of the Invention

This invention relates to a computer-based technique for organizing media, and more particularly to a method and apparatus for organizing digital media based on face recognition.

2. Description of the Related Art

Digital cameras have gained popularity in recent years, in part due to the flexibility offered by electronic image storage. By storing digital photos on a personal computer, laptop, a network accessible server, etc., users are able to organize, edit, and share their images. Also, as compared to film-based photography, the user of a digital camera can typically assess the quality of a photo immediately, without spending time and money on a set of prints containing at least some low quality images. In view of the widespread transition from analog to digital photos, service providers and vendors have introduced a variety of products, web-based services, and software tools, including processing software tools for editing digital photos and services for remotely ordering prints and other products (e.g., holiday cards) using the user's picture file(s). File browsing and media viewing software typically allows users to organize and view their photos in electronic Albums, for example organized in folders based on dates (e.g., October 2003) and events (e.g., Ski Trip—January 2002). Considering that the average user has hundreds of photos, such tools offer a convenient way to organize and retrieve photos.

Despite these existing products and services, the inventors of this application has found that the need exists for more-advanced techniques and software tools for conveniently and quickly organizing digital photos.

SUMMARY OF THE INVENTION

In one aspect, the present invention is directed to a computer-based method and apparatus for organizing digital media, particularly digital photos, using recognition techniques. According to a first aspect of the present invention, a computer-based method for organizing digital photos comprises: extracting objects of interest from a plurality of digital photos; cropping the plurality of digital photos to generate images of isolated objects of interest; applying a recognition algorithm to determine the similarity of isolated objects with a reference; displaying a plurality of objects of interest arranged as a function of the determined similarity; and receiving user input to associate the objects and corresponding digital photos with a particular classification.

According to a second aspect of the present invention, an apparatus for organizing digital photos comprises: an object detecting unit for detecting objects of interest in a plurality of digital photos and cropping the plurality of digital photos to generate images of isolated objects of interest; a recognition unit for applying a recognition algorithm to determine the similarity of isolated objects with a reference; a display output for displaying a plurality of objects arranged as a function of the determined similarity; and a user input for receiving user input to associate the objects and corresponding digital photos with a particular classification.

In accordance with one embodiment of the present invention, the operations of applying the recognition algorithm and displaying image objects as a function of determined similarity are repeated as objects are classified. In one embodiment, the objects are faces.

BRIEF DESCRIPTION OF THE DRAWINGS

Further aspects and advantages of the present invention will become apparent upon reading the following detailed description and with reference to the appended drawings, in which.

DETAILED DESCRIPTION

Embodiments of the present invention are more specifically set forth in the following description with reference to the appended figures. Generally, the present invention is directed to a computer-based method and system for organizing media, and more particularly to a computer-based system and method for organizing digital photos in accordance with objects detected and recognized in the digital photos. In one implementation described in detail below, a group of digital photos is organized by detecting and recognizing faces appearing therein.

The present invention may be implemented as a computer-executed software product, installed on a user's personal computer (or some other suitable device) to allow the user to organize a collection of digital photographs in accordance with the people appearing in the photographs. In one embodiment, a system for organizing and processing photographs is provided with at least one face recognition algorithm, which determines the similarity of faces appearing in a collection of photographs to at least one face in a model folder. The present invention may be implemented to allow a user to set up folders for different people, find similar faces to a face or faces in these folders, and add photographs to the "people folders" based on detected similarity. One implementation of the present invention is described in which face detection and recognition are used as tools (e.g., as a software plug-in for a photo storing/processing application) for facilitating digital photo organization (e.g., allowing the user to organize hundreds or photographs based on people in a few minutes). Although the following description details a specific workflow with reference to specific display screens shown in the figures, it should be recognized that many variations are possible.

Figure 1:
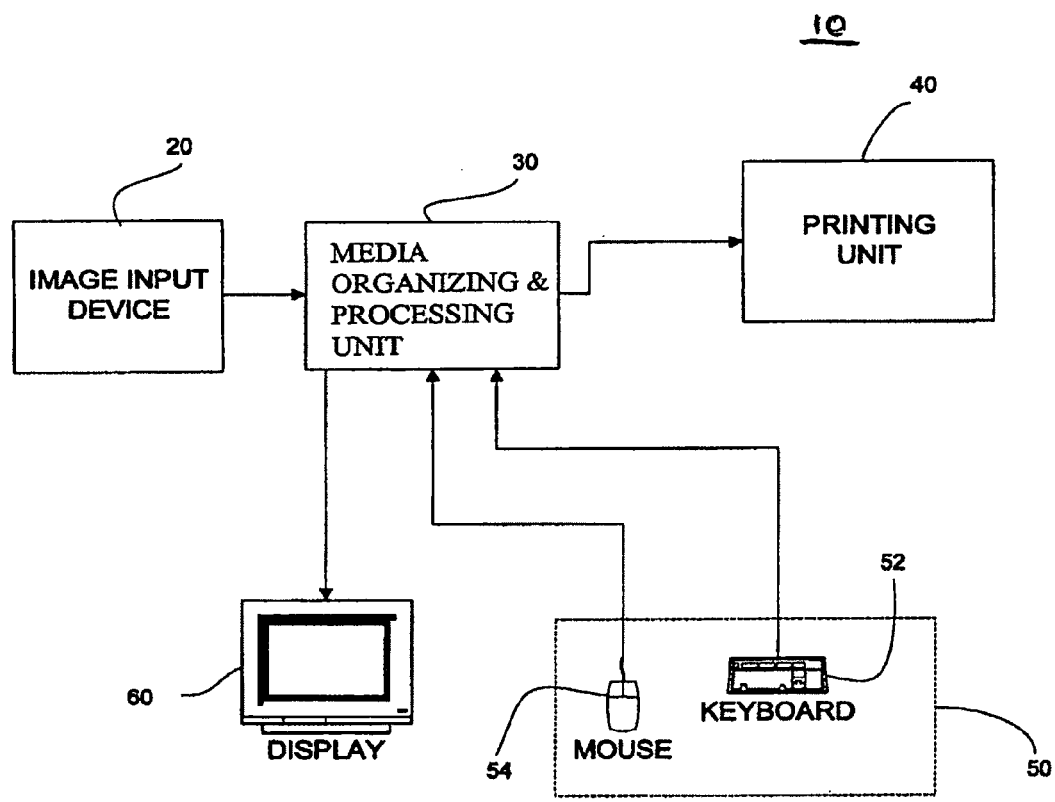
FIG. 1 is a block diagram of a system for organizing digital media according to an embodiment of the present invention.

FIG. 1 is a block diagram of a system for organizing digital photos according to an embodiment of the present invention. The system 10 illustrated in FIG. 1 includes the following components: an image input device 20; a media organizing and processing unit 30; a printing unit 40; a user input unit 50; and a display 60. Operation of and functional interaction between the components illustrated in FIG. 1 will become apparent from the following description.

The image input device 20 provides digital image data representing a photograph. The image input device 20 may be one or more of any number of devices for providing digital image data derived from photographic film or a digital camera, e.g., a recording medium (a CD-R, floppy disk, etc.) or a network connection. The image input device 20 may be a scanner for scanning images recorded on paper or film, e.g., including CCD sensors for photoelectronically reading R (red), G (green), and B (blue) image information from film, frame by frame. The media organizing and processing unit 30 receives digital image data from the image input device 20 and performs recognition-based media organizing in a manner discussed in detail below. Although not a focus of this application, the media organizing and processing unit 30 may perform other functions, such as image compression, editing, color/density correction, etc., in accordance with commands received from the user input device 50. A user views graphical user interface (GUI) display screens and other information (including photos) output by the media organizing and processing unit 30 on a display 60 and inputs commands and other information to the media organizing and processing unit 30 via the user input device 50. In the embodiment illustrated in FIG. 1, the user input device 50 includes a keyboard 52 and a mouse 54. The printing unit 40 selectively receives image data from the media organizing and processing unit 30 to generate prints.

Figure 2:
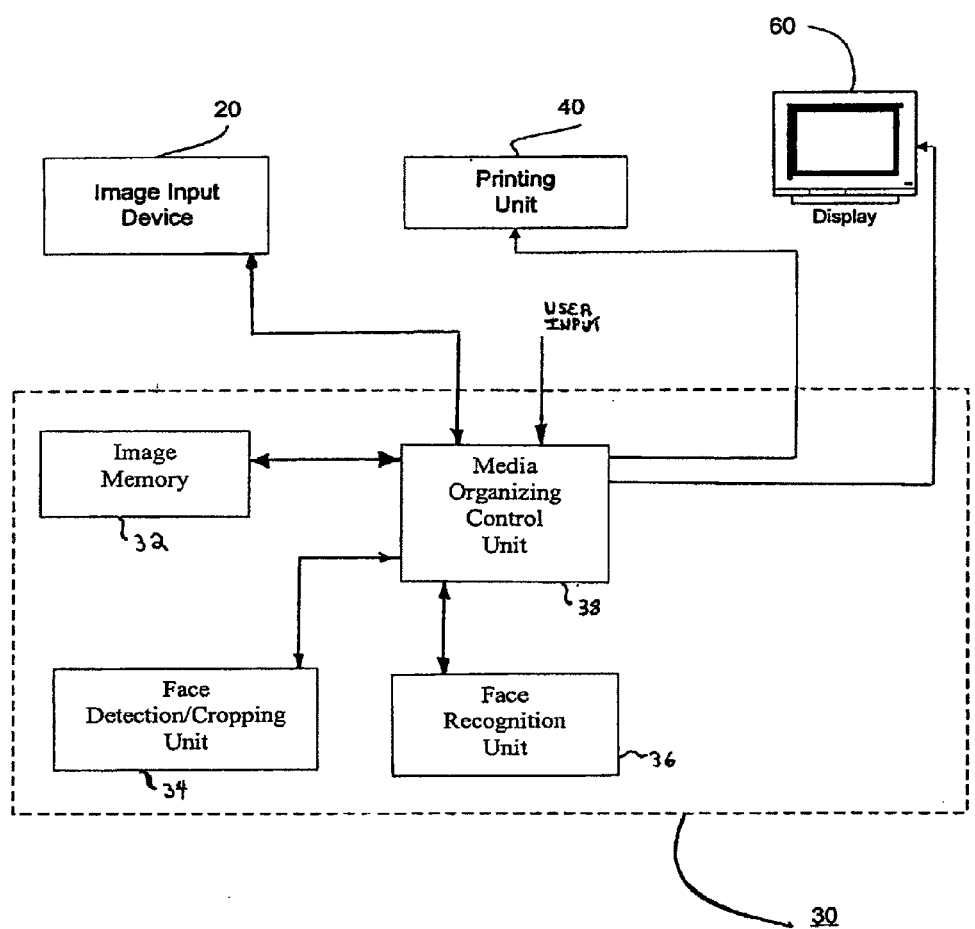
FIG. 2 is a block diagram illustrating in more detail aspects of the media organizing and processing unit of the system illustrated in FIG. 1 according to an embodiment of the present invention.

FIG. 2 illustrates details of the media organizing and processing unit 30 for performing recognition-based media organizing of digital photos according to an embodiment of the present invention. As shown in FIG. 2, the media organizing and processing unit 30 according to this embodiment includes: an image memory 32, which stores digital image data; a face detection/cropping unit 34; a face recognition unit 36; and a media organizing control unit 38. Although the various components of FIG. 2 are illustrated as discrete elements, such an illustration is for ease of explanation and it should be recognized that certain operations of the various components may be performed by the same physical device, e.g., by a microprocessor of a user's personal computer. Operation of the components of the media organizing and processing unit 30 in FIG. 2 will next be described with reference to FIGS. 3-7.

Figure 3:
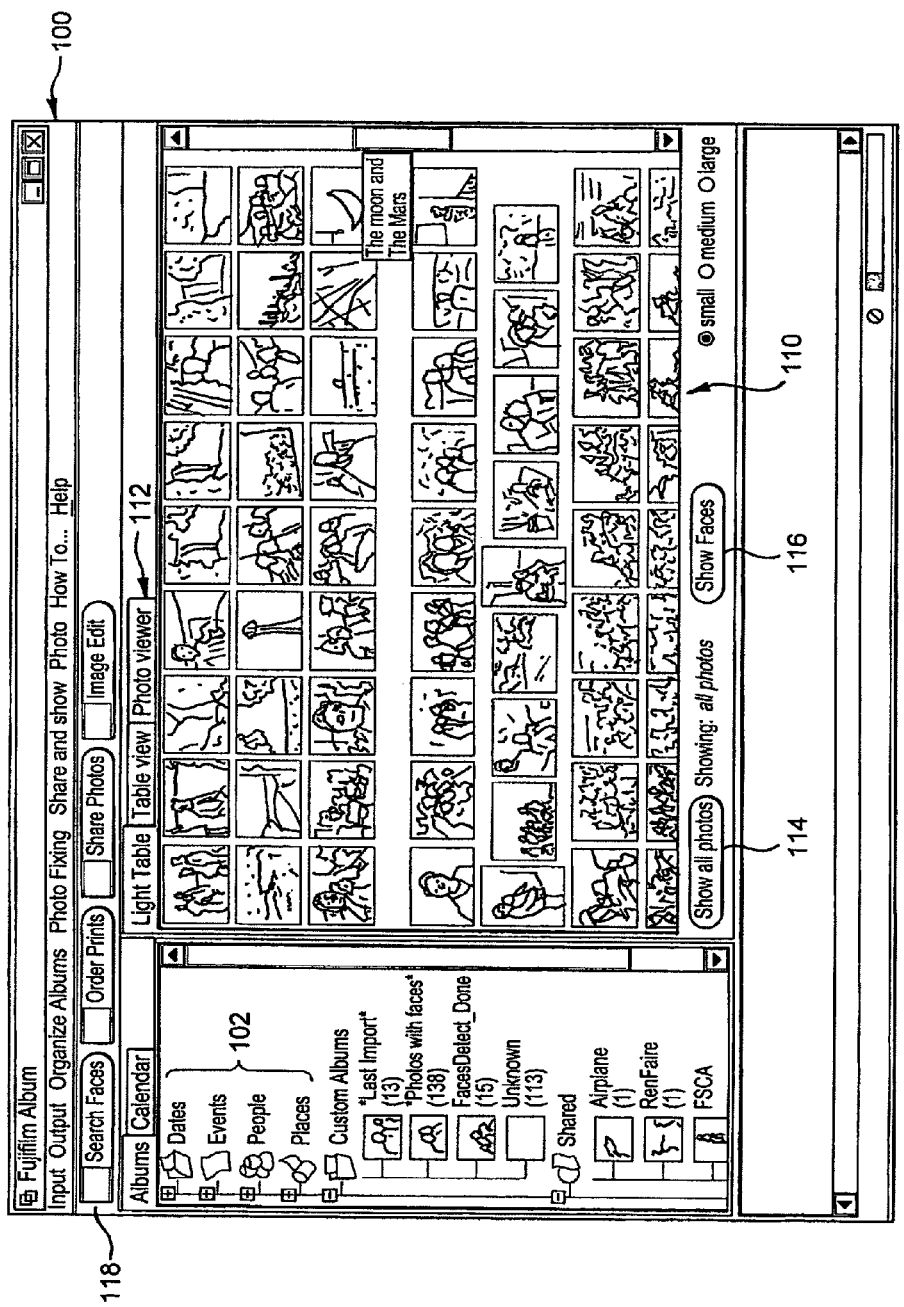
FIG. 3 is an exemplary graphical user interface display screen associated with media organizing and browsing according to an embodiment of the present invention.

FIG. 3 is an exemplary GUI display screen 100 output by the media organizing control unit 38 to the display 60 in accordance with one implementation of the present invention. The GUI display screen 100 illustrated in FIG. 3 allows the user to initiate and control various media organizing and viewing functions provided by the media organizing control unit 38. The display screen 100 includes a category list 102 of general media organizing categories, including "dates," "events," "places," and "people," which constitute digital photo albums. Accordingly, the user may select from this category list 102 to organize digital photos and/or access previously-organized digital photos based on these general categories. For example, the user may select "dates" from the category list 102 to organize and/or browse digital photos organized by date. Likewise, the user may select "events" to organize and/or browse digital photos organized by the event at which they were taken (e.g., vacation 2002, graduation 2003, etc.). Furthermore, in accordance with principles of the present invention, the user may select "people" to organize digital photos based on the faces appearing therein, using face recognition, and browse digital photos previously organized based on people. Each general category in the category list 102 will typically include multiple folders, which may further contain sub-folders. Thus, under the "people" category, separate folders may be set up for "family," "classmates," "work colleagues," etc., each containing a sub-folder for an individual member of the particular category.

The GUI display screen 100 further includes a display window 110 for viewing photos. In the example of FIG. 3, the display window 110 displays an index view of photos in a selected folder. This may be initiated by selecting a "show all photos" button 114. Also, the user may view cropped faces appearing in photos of the selected folder in the display window 110 by selecting a "show faces" button 116. Extracting and cropping faces from a group of digital photos will be described in greater detail below. An individual photo may be viewed by clicking on the desired photo in the display window 110 and selecting a "photo viewer" tab 112. In accordance with principles of the invention, the face recognition-based organization may be initiated by selecting a "search faces" button 118 from the display screen 100. The display screen 100 includes various additional icons and menus for performing related functions, such as ordering prints, sharing photos, editing images, etc.

Figure 4:
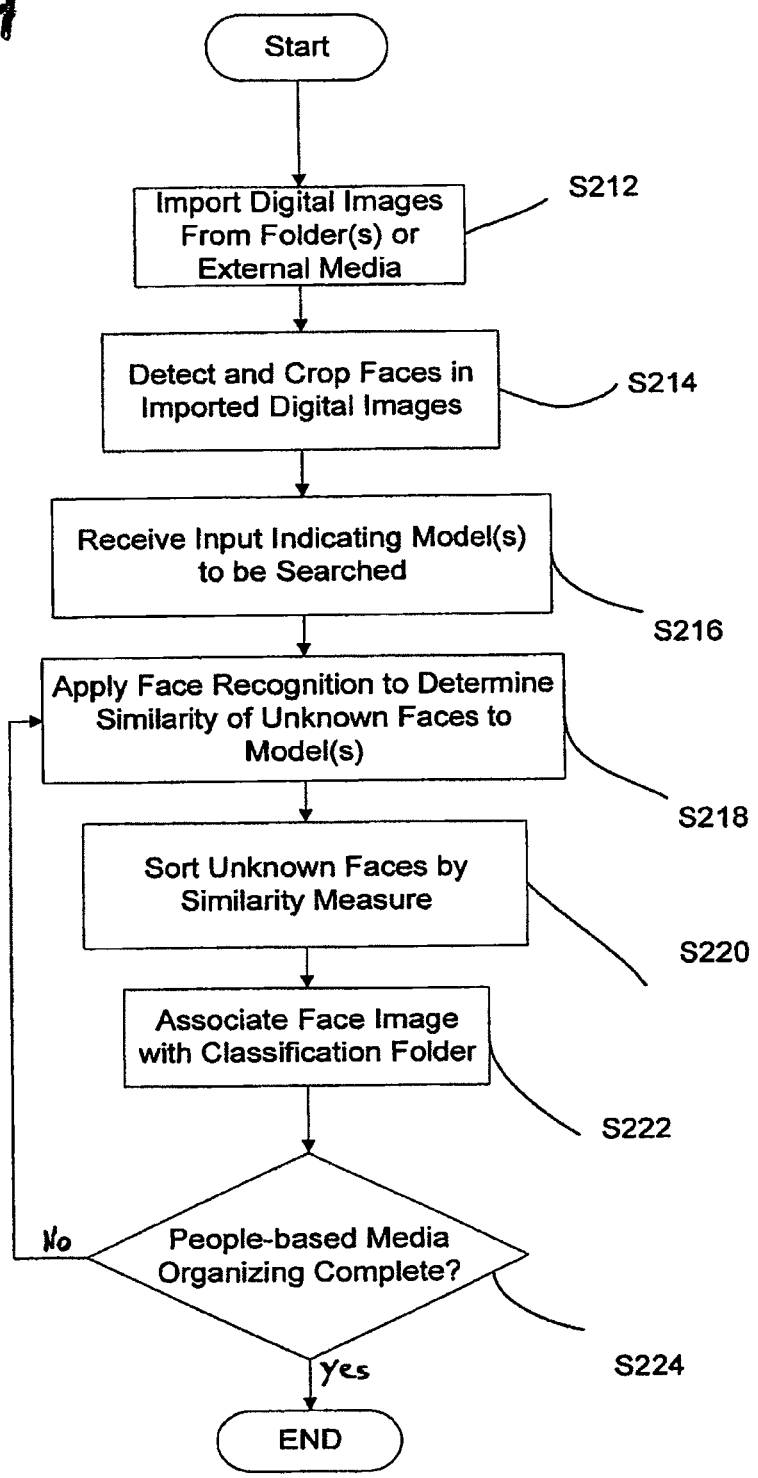
FIG. 4 is a flow diagram illustrating operations performed for recognition-based organization of digital photos in accordance with an embodiment of the present invention.
Figure 5:
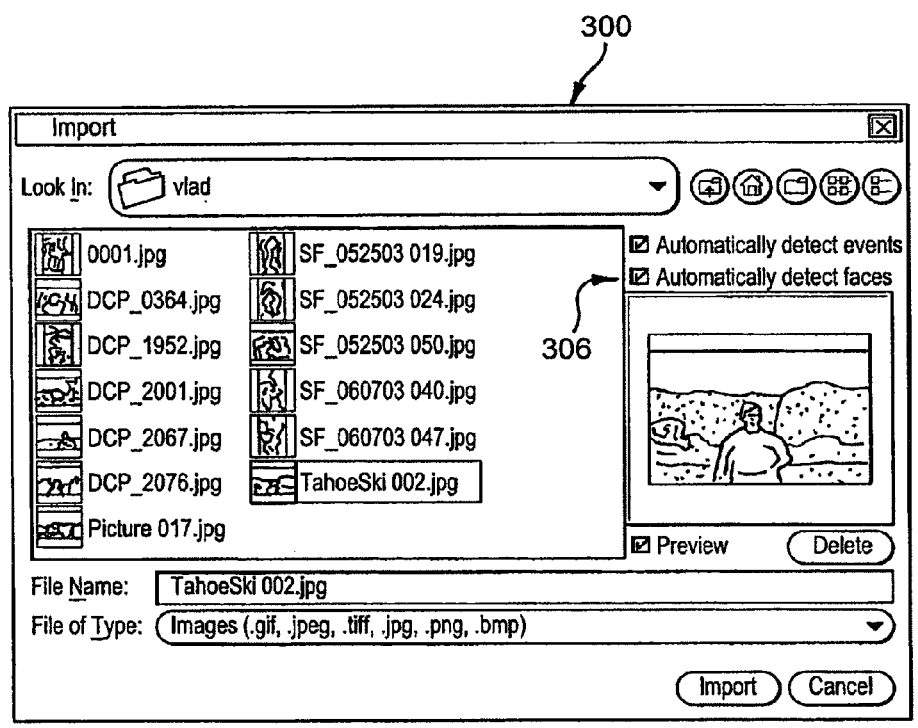
FIG. 5 is an exemplary graphical user interface display screen associated with importing images for face recognition-based organizing of digital photos in accordance with an embodiment of the present invention.

FIG. 4 is a flow diagram illustrating functions performed by the media organizing and processing unit 30 to organize digital photos based on face recognition in accordance with an embodiment of the present invention. Initially, digital images are imported for organization in one or more of the digital photo album categories in list 102 (step S212). These digital images may be imported from existing folders (e.g., stored in image memory 32) or input via external media, such as the image input device 20. FIG. 5 illustrates an exemplary GUI display screen 300 for importing digital photos, which allows the user to select folders or individual images to be imported. The face detection/cropping unit 34 detects faces in the imported digital photos and crops out the face(s) from the digital photos to obtain a view of the individual faces in the imported digital photos (S214). The face detection/cropping unit 34 may utilize a face detection algorithm such as that disclosed in U.S. patent application Ser. No. 10/440,173, titled "Method and Apparatus for Red-Eye Detection," which is herein incorporated by reference. Other techniques for face detection may also be utilized.

The user is able to control whether to automatically detect and crop out faces for images being imported, e.g., by selecting the "automatically detect faces" button 306 on the GUI display screen 300 shown in FIG. 5. In other words, the face detection/cropping unit 34 may perform face detection and cropping in the background as the user is performing other functions. If a user decides not to detect faces at the time of importing the photos, the user can select a "detect faces" menu option (not shown) at any time. Again, the face detection/cropping unit 34 may operate in the background with low priority, meaning that other tasks (operations) can be performed while the detection is being done. The detect faces operation need only be performed once for each imported digital photo. After face detection and cropping has been performed for a set of imported digital photos, the user may select a "show faces" button 116 of the GUI display screen 100 to view the detected faces in the display window 110.

Figure 6:
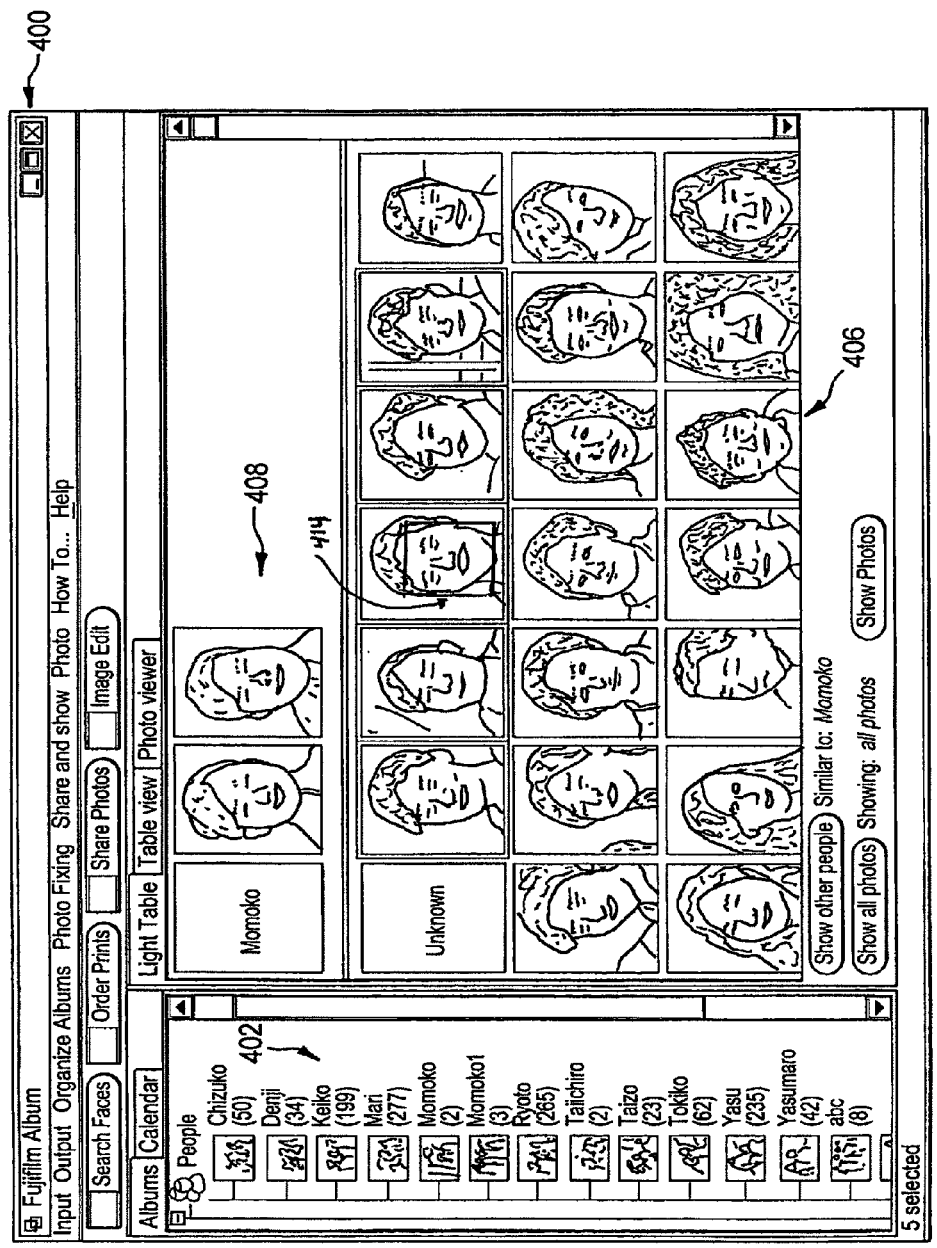
FIG. 6 is an exemplary graphical user interface display screen associated with displaying face images sorted by similarity to model face images to assist the user in organizing digital photos.

At any time after face detection and cropping for a group of imported digital images has been executed, the user may initiate face recognition-based organization of such digital photos. FIG. 6 is an exemplary graphical user interface display screen associated with displaying face images sorted by similarity to model face images to assist the user in organizing digital photos. Although the face detection/cropping unit 34 extracts faces appearing in digital photos, it can be seen from FIG. 6 that the face view may show an area larger than the face (face area 414) so that the user can view the entire face and surrounding features, such as the head, neck, and hat (if worn). This results in a better viewing image as compared to just viewing the face itself.

The user may select a folder 402 under the "people" category in GUI display screen 400 (in category list 102) or create a new person folder (S216). To serve as a basis for face recognition, the selected folder or new folder must contain at least one face image. The user may drag and drop any of the faces from an "unknown" display window portion 406 (i.e., displaying faces from imported digital photos that have not been associated with a particular person folder). Once the user has selected the person folder for matching with "unknown" faces (which serves as a comparison model), the face recognition unit 36 applies face recognition to determine similarity of unknown faces to the selected model (S218).

A previously classified image of a person may appear substantially different than the same person in other photographs (e.g., due to different angles, poses, photographing positions, aging, etc.). Thus, a preferred embodiment of the present invention utilizes a face recognition algorithm that provides good results under such conditions. One implementation of the present invention utilizes the face recognition algorithm described in the U.S. Patent application titled "Method and Apparatus for Object Recognition Using Probability Models" filed on even date herewith and which is hereby incorporated by reference. Such a face recognition algorithm has also been described in U.S. Provisional Application No. 60/519,639 filed Nov. 14, 2003, which has been incorporated herein by reference in its entirety. After the face recognition unit 36 obtains a similarity measure for each unknown face, the media organizing control unit 38 sorts the unknown faces by similarity measure (most similar to least similar) and outputs an updated "unknown" display window portion 406 (FIG. 6) showing the unknown faces in sorted order (S220). Using this updated display 400, the user is able to drag and drop one or more of the sorted unknown faces from the "unknown" display window portion 406 into a model display window portion 408 (step S222). If, after the user has dragged and dropped an unknown face into the model display window portion 408, there are additional unknown faces (S224), the face recognition algorithm is repeated (S218). In other words, the face recognition unit 36 in accordance with one embodiment of the present invention may output different results depending on the images in the model folder 402, particularly because as additional faces from different conditions are added to the folder 402, the accuracy of the recognition improves and the recognition results change. Thus, the arrangement of unknown faces in display window portion 406 is updated as the user drags and drops unknown faces into the model display window portion 408 to improve the user's ability to quickly and reliably associate unknown faces and the corresponding digital photos with the model folder 402. When the media organizing control unit 38 determines that the people-based media organizing is complete (S224), the process ends. Using the above-described technique, the user is able to organize even hundreds of photos in a short time based on the people appearing therein.

Figure 7A:
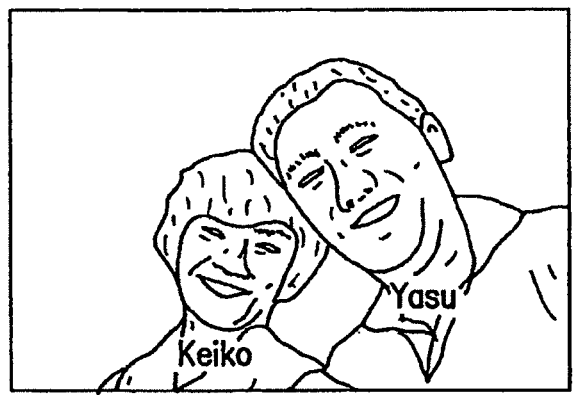
FIGS. 7A-7C illustrate an exemplary digital photo presentation using the results of face recognition in accordance with an embodiment of the present invention.
Figure 7B:
Figure 7C:

Having detected and recognized faces in digital photos, the resulting information can be used in accordance with principles of the present invention to enhance photo viewing presentations. For example, as shown in FIG. 7A, the folder name corresponding to a face in a digital photo can be displayed along with the digital photo. This may be done during a "slide presentation" of a group of digital photos. Furthermore, as shown in FIG. 7B, the name of a classified face may be displayed when the user moves the cursor over a displayed face. Furthermore, by clicking on the person's name, the media organizing control unit 38 may initiate a zooming function to zoom in on the detected person as shown in FIGS. 7B-7C. More than one person can be specified to initiate a panning display between multiple faces in the digital photo being viewed.

Although embodiments of the present invention have been described above in the context of face-recognition, principles of the present invention may be applied to organizing digital photos based on other types of objects that can be detected and recognized in the digital photos. The invention having thus been described, it should be apparent that various other modifications are possible without departing from the spirit and scope of the present invention. For example, depending on accuracy, digital photos may be automatically grouped in people folders based on face recognition, providing the user with the option of re-assigning incorrectly grouped photos.

We claim:

1. A computer-based method for organizing digital photos, comprising:
    (a) detecting and cropping out faces from a plurality of digital photos in a first group to generate isolated face images;
    (b) applying a face recognition algorithm to determine similarity of each of the isolated face images contained in the digital photos in the first group with a model face image set, wherein the model face image set includes at least one model face image contained in a digital photo in a second group;
    (c) displaying the isolated face images on a display screen in accordance with the determined similarity;
    (d) receiving a user input to select one of the isolated face images displayed on the display screen;
    (e) reclassifying the digital photo containing the selected one of the isolated face images into the second group instead of the first group;
    (f) modifying the model face image set by adding the selected one of the isolated face images;
    (g) renewing the determined similarity by applying the face recognition algorithm to determine similarity of each of the isolated face images contained in the digital photos in the first group with the modified model face image set; and
    (h) displaying the isolated face images on the display screen in accordance with the renewed determined similarity.

2. The method as defined in claim 1, wherein in the step (c), each of the isolated face images is displayed in a view that includes an area surrounding the face.

3. The method as defined in claim 1, further comprising:
(i) after the step (h), repeatedly executing the steps (d), (e), (f), (g) and (h).

4. The method as defined in claim 1, wherein:
in the step (c), the isolated face images are displayed on the display screen in a first area; and
in the step (d), the user input drags the selected one of the isolated face images on the display screen from the first area into a second area in which the model face image set is to be displayed.

5. The method as defined in claim 4, further comprising:
(j) before the step (d), displaying the model face image set on the display screen in the second area.

6. The method as defined in claim 1, further comprising:
(k) before the step (b), receiving a user input to designate the model face image; and
(l) after the step (k) and before the step (b), preparing the model face image set including the designated model face image.

7. The method as defined in claim 6, wherein:
the second group has been associated with a particular person; and
in the step (k), the user input selects the second group among a plurality of groups respectively associated with a plurality of persons.

8. The method as defined in claim 6, further comprising:
(m) before the step (k), displaying the isolated face images on the display screen, wherein in the step (k), the user input selects one of the isolated face images displayed on the display screen as the model face image; and
(n) after the step (k) and before the step (b), reclassifying the digital photo containing the selected one of the isolated face images selected in the step (k) into the second group instead of the first group.

9. The method as defined in claim 8, wherein:
in the step (m), the isolated face images are displayed on the display screen in a first area; and
in the step (k), the user input drags the selected one of the isolated face images on the display screen from the first area into a second area in which the model face image set is to be displayed.

10. The method as defined in claim 1, wherein in the step (c), the isolated face images are displayed in order of the determined similarity.

11. The method as defined in claim 1, wherein in the step (h), the isolated face images are displayed in order of the renewed determined similarity.

12. An apparatus for organizing digital photos, comprising:
a face detection and cropping unit configured to detect and crop out faces from a plurality of digital photos in a first group to generate isolated face images;
a face recognition unit configured to apply a face recognition algorithm to determine similarity of each of the isolated face images contained in the digital photos in the first group with a model face image set, wherein the model face image set includes at least one model face image contained in a digital photo in a second group;
a display output unit configured to output a display of the isolated face images on a display screen in accordance with the determined similarity;
a user input unit configured to receive user input; and
a media organizing control unit configured
to cause the user input unit to receive a user input to select one of the isolated face images displayed on the display screen,
to reclassify the digital photo containing the selected one of the isolated face images into the second group instead of the first group,
to modify the model face image set by adding the selected one of the isolated face images,
to renew the determined similarity by causing the face recognition unit to apply the face recognition algorithm to determine similarity of each of the isolated face images contained in the digital photos in the first group with the modified model face image set, and
to cause the display output unit to output a display of the isolated face images on the display screen in accordance with the renewed determined similarity.

13. The apparatus as defined in claim 12, wherein the display output unit is configured to output the display of each of the isolated face images in a view that includes an area surrounding the face.

14. The apparatus as defined in claim 12, wherein the media organizing control unit is configured to repeatedly execute, after causing the display output unit to output the display of the isolated face images on the display screen in accordance with the renewed determined similarity,
causing the user input unit to receive a user input to select one of the isolated face images displayed on the display screen,
reclassifying the digital photo containing the selected one of the isolated face images into the second group instead of the first group,
modifying the model face image set by adding the selected one of the isolated face images,
renewing the determined similarity by causing the face recognition unit to apply the face recognition algorithm to determine similarity of each of the isolated face images contained in the digital photos in the first group with the modified model face image set, and
causing the display output unit to output a display of the isolated face images on the display screen in accordance with the renewed determined similarity.

15. The apparatus as defined in claim 12, wherein:
the display output unit is configured to output the display of the isolated face images on the display screen in a first area, and to output a display of the model face image set on the display screen in a second area; and
the media organizing control unit is configured to cause the user input unit to receive the user input dragging the selected one of the isolated face images on the display screen from the first area into the second area.

16. The apparatus as defined in claim 12, wherein the media organizing control unit is configured to cause the user input unit to receive a user input to designate the model face image, and is configured to prepare the model face image set including the designated model face image.

17. The apparatus as defined in claim 16, wherein:
the second group has been associated with a particular person; and
the media organizing control unit is configured to cause the user input unit to receive the user input selecting the second group among a plurality of groups respectively associated with a plurality of persons.

18. The apparatus as defined in claim 16, wherein:
the display output unit is configured to output a display of the isolated face images on the display screen before the face recognition unit determines the similarity of each of the isolated face images; and
the media organizing control unit is configured to cause the user input unit to receive the user input selecting one of the isolated face images displayed on the display screen as the model face image, and is configured to reclassify the digital photo containing the selected one of the isolated face images selected by the user input into the second group instead of the first group.

19. The apparatus as defined in claim 18, wherein:
the display output unit is configured to output the display of the isolated face images on the display screen in a first area, and to output a display of the model face image set on the display screen in a second area; and
the media organizing control unit is configured to cause the user input unit to receive the user input dragging the selected one of the isolated face images on the display screen from the first area into the second area.

20. The apparatus as defined in claim 12, wherein the media organizing control unit is configured to cause the display output unit to output the display of the isolated face images on the display screen in order of the renewed determined similarity.

* * * * *